US006471899B2

(12) United States Patent
Daiber et al.

(10) Patent No.: US 6,471,899 B2
(45) Date of Patent: *Oct. 29, 2002

(54) METHOD OF MOLDING A CANDLE

(75) Inventors: Paul M. Daiber, Williamstown, NJ (US); Victor DeSanta, Williamstown, NJ (US)

(73) Assignee: P & V Candle Equipment Sales Inc., Williamstown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,243

(22) Filed: Jan. 15, 1999

(65) Prior Publication Data

US 2002/0041055 A1 Apr. 11, 2002

(51) Int. Cl.[7] .............................................. B29C 39/18

(52) U.S. Cl. ....................... 264/238; 264/334; 264/275; 425/803

(58) Field of Search ......................... 425/803; 249/117, 249/142, 144, 63, 74, 136; 264/255, 271.1, 263, 267, 268, 275, 238, 334

(56) References Cited

U.S. PATENT DOCUMENTS

| | | | | | |
|---|---|---|---|---|---|
| 345,272 | A | | 7/1886 | Brown | 425/290 |
| 1,390,257 | A | * | 9/1921 | Dillman | 425/803 |
| RE20,854 | E | | 9/1938 | Deckert | 264/254 |
| 2,520,682 | A | | 8/1950 | Harrison et al. | 425/803 |
| 3,015,847 | A | | 1/1962 | Holden et al. | 249/142 |
| 3,759,478 | A | | 9/1973 | Schmitt et al. | 249/93 |
| 3,998,922 | A | * | 12/1976 | Weiss | 425/803 |
| 5,078,945 | A | * | 1/1992 | Byron | 425/803 |
| 5,939,005 | A | * | 8/1999 | Materna | 425/803 |

* cited by examiner

*Primary Examiner*—Jan H. Silbaugh
*Assistant Examiner*—Thu Khanh T. Nguyen
(74) *Attorney, Agent, or Firm*—Norman E. Lehrer

(57) ABSTRACT

A candle making apparatus for molding a candle including a container and a plate is provided. The plate has a rod attached thereto. The plate is placed within the container so that the rod extends above the rim of the container and the plate rests on the bottom of the container. In order to use the apparatus hot wax is poured into the container and the wax is allowed to cool. Once the wax has cooled, the rod is grasped and the plate and rod are removed from the container with the wax molded around the rod. Once the plate and rod are removed from the container, the plate is grasped and the molded wax is removed from the plate so that a hole is formed through the center of the wax. Next, a waxed wick is inserted through the hole in the molded wax thereby forming a candle.

3 Claims, 2 Drawing Sheets

METHOD OF MOLDING A CANDLE

BACKGROUND OF THE INVENTION

The present invention is directed toward a candle making apparatus and more particularly, toward a container which allows a candle to be molded and removed easily so that a wick may be placed through the center of the candle.

Typically, a candle is formed by pouring hot wax into a container or mold and allowing the wax to cool. Before the wax is completely cooled, a wick is inserted into the center of the container and is held in place above the container. Once the wax has cooled completely, it is removed from the container with the wick intact. This is a very tedious, time-consuming, and labor intensive process.

Other methods of forming a candle are generally variations of the above described method. For example, how the wick is held in place may vary. A person may actually hold the wick in place; a rod may be placed across the top of the container to which the wick is fastened; or the container may be placed under a horizontal rod to which the wick is secured and extends into the hot wax. Also, the manner in which the candle is removed from the container or mold may vary. For example, the candle may be manually separated from the container or mold. Or, the container may be placed into a bath of cold water which loosens the hardened wax from the mold and facilitates removal of the now formed candle from the container.

Another method of forming a candle is disclosed in the U.S. Pat. No. 2,520,682 to Harrison et al. This patent describes a method for making candles including a shell in the form of a truncated cone, a wick pin having an eye, and an insert. The wick pin is secured to the bottom of the shell and the insert fits into the open of the shell. The insert has an opening through which the pin is inserted as well as a plurality of openings through which molten wax is poured into the shell. Wax is poured into the shell to completely fill the shell and to cover the insert. When the wax has solidified, a wick is inserted through the eye of the wick pin. The candle body, together with the insert, is removed from the shell so that passing the candle over the wick pin, the candle is wicked as it is being pulled out of the shell.

Also, U.S. Pat. No. Re 20,854 to Deckert discloses a method of making a candle using a container with a rod inserted therein. The rod is held in place by fingers located on a plate which is secured to the bottom of the container. Hot wax is poured into the container to a point which is below the top of the container. The wax is allowed to cool and the rod is removed. A wick may be then inserted through the hole formed by the rod.

SUMMARY OF THE INVENTION

The present invention is designed to overcome the deficiencies of the prior art discussed above. It is an object of this invention to provide a simple method for molding a candle.

It is a further object of the invention to provide an apparatus which allows for removing a molded candle from the apparatus easily and placing a wick through the center thereof.

In accordance with the illustrative embodiments demonstrating features and advantages of the present invention, there is provided a candle making apparatus for molding a candle. The apparatus includes a container and a plate with a rod or stem attached thereto. The plate rests within the container with the rod extending above the rim of the container. In order to use the apparatus hot wax is poured into the container and the wax is allowed to cool. Once the wax has cooled, the rod is grasped and the plate and rod are removed from the container with the wax molded around the rod. Once the plate and rod are removed from the container, the plate is grasped and the molded wax is removed from the plate so that a hole is formed through the center of the wax. Next, a waxed wick is inserted through the hole in the molded wax thereby forming a candle.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
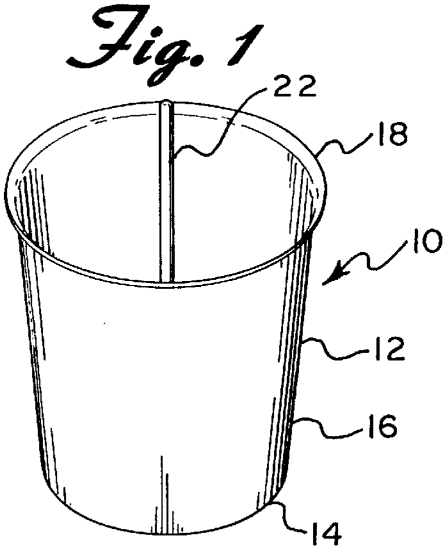
FIG. 1 is a perspective view of the candle making apparatus of the present invention including the container and plate within the container.

Referring now to the drawings in detail wherein like reference numerals have been used throughout the various figures to designate like elements, there is shown in FIG. 1 a candle making apparatus constructed in accordance with the principles of the present invention and designated generally as 10.

Figure 2:
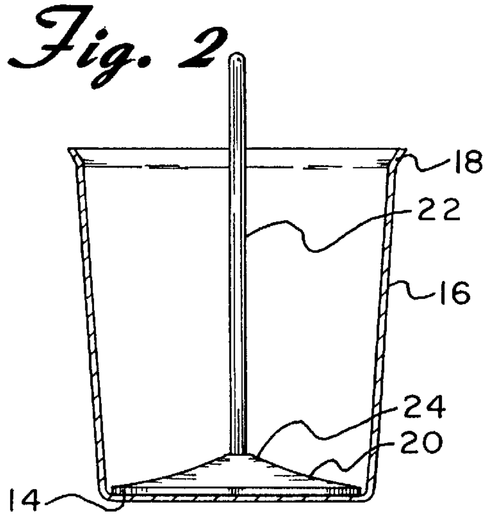
FIG. 2 is a perspective view of the container of the present invention showing the container partially cut away.

The candle molding apparatus 10 essentially includes a container 12 and a plate 20. The container 12 has a bottom wall 14 enclosing the bottom of the container 12, a side wall 16 extending upwardly from the bottom wall 14, and a rim 18 extending around the top of the side wall 16. (See FIG. 2.) The plate 20 has a stem or rod 22 attached to the center 24 of the plate 20. The plate 20 has a circumference slightly smaller than the inner circumference of the container 12 so that the plate 20 can be placed within the container 12 and rest on the bottom wall 14 of the container 12 but can also be easily removed. The plate 20 should be removably placed or mounted within the container 12 and should not be permanently attached to the container. The rod 22 should extend above the rim 18 of the container 12 when the plate 20 is placed within the container 12.

The shape of the container, while shown as generally cylindrical, may be any shape as long as the plate fits within the container and can be easily removed therefrom. Likewise, the shape of the plate and stem may vary as long as the plate fits within the container and the stem extends above the rim of the container. The size of the plate and container may also vary. Also, the top of the container should be slightly wider and the walls tapered in order to facilitate removal of the candle. The container, plate, and rod may be made from any lightweight material having a high heat capacity such as aluminum, for example. The rod may be attached, secured, or mounted to the plate by any method known in the art. For example, the rod may be welded onto the plate.

Figure 3:
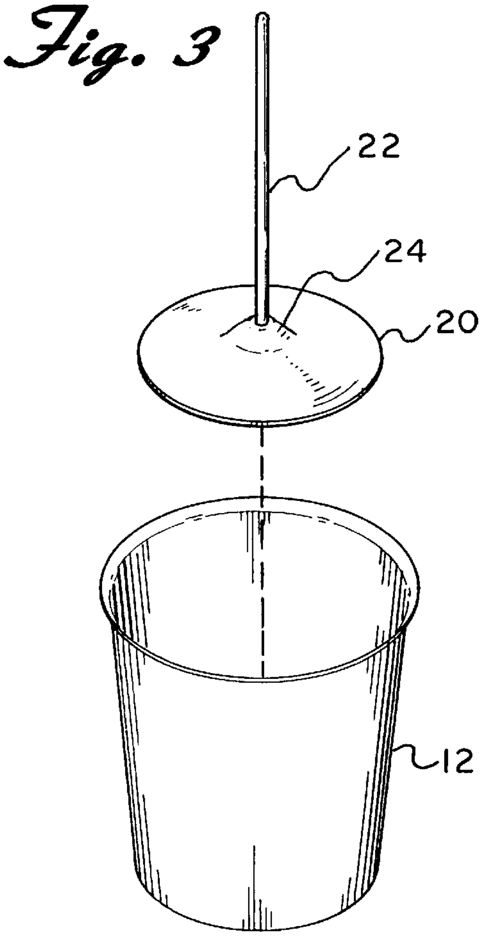
FIG. 3 is an exploded view of FIG. 1.
Figure 4:
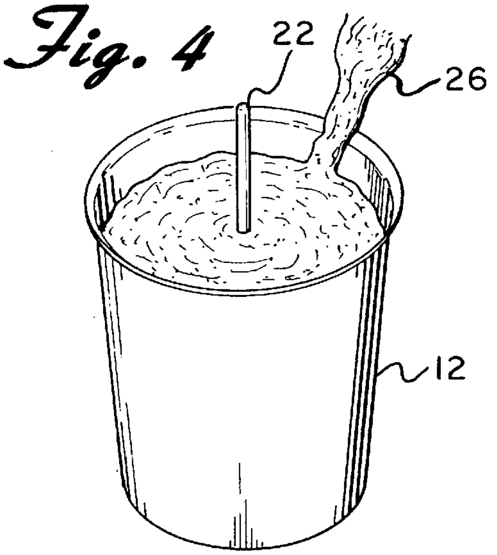
FIG. 4 illustrates the step in the method of using the candle making apparatus of the present invention where the container is filled with hot wax.
Figure 5:
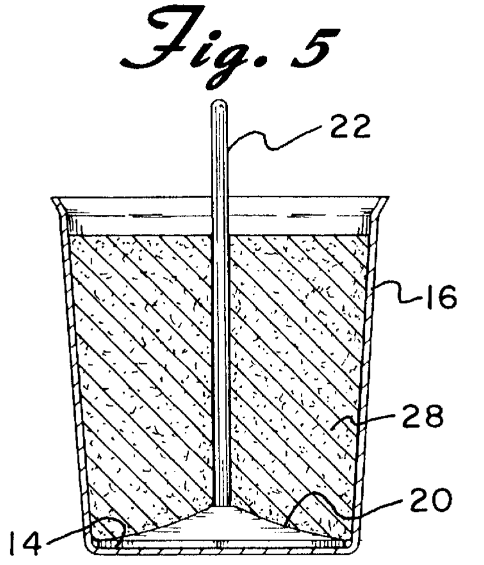
FIG. 5 is a perspective view of the container of the present invention showing the container partially cut away where the wax within the container has solidified.
Figure 8:
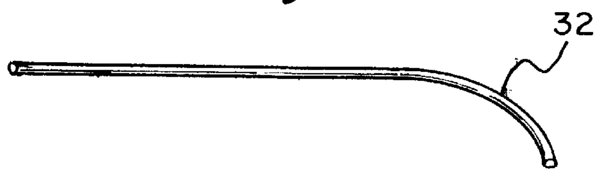
FIG. 8 is a perspective view of the waxed wick to be inserted into the candle.
Figure 7:
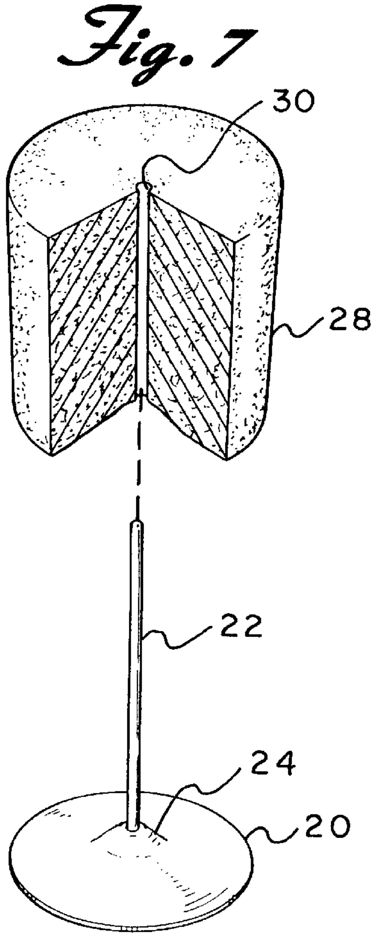
FIG. 7 illustrates the step in the method of using the candle making apparatus of the present invention where the plate is removed from the candle.
Figure 6:
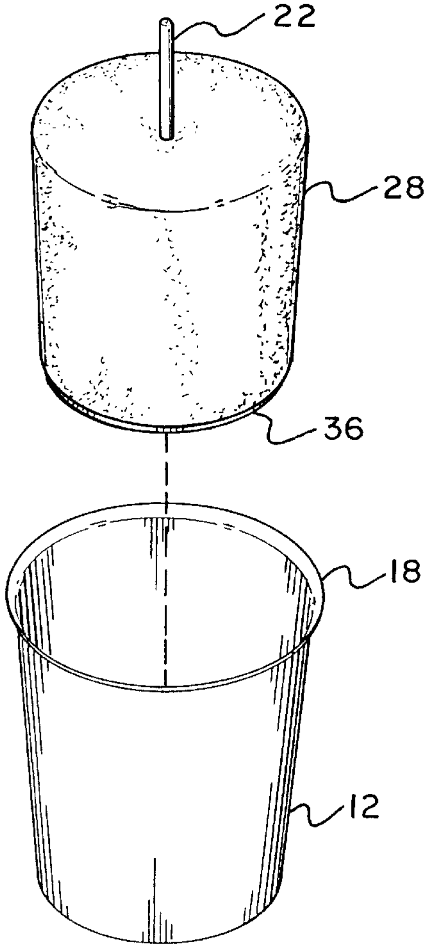
FIG. 6 illustrates the step in the method of using the candle making apparatus of the present invention where the solidified wax is removed from the container using the rod.
Figure 9:
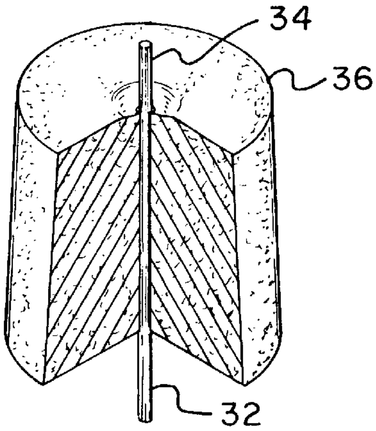
FIG. 9 illustrates the step in the method of using the candle making apparatus of the present invention where the waxed wick is placed through the center of the candle.

In order to use the apparatus of the present invention, the plate 20 is placed within the container 12 with the rod 22 extending above the rim 18 of the container 12 and the plate 20 resting on the bottom wall 14 of the container 12. (See FIG. 3.) Hot wax 26 is poured into the container 12 and the wax is allowed to cool. (See FIG. 4.) Once the wax has cooled, the rod 22 is grasped and lifted out so that the plate 20 and rod 22 are removed entirely from the container 12. The wax is now molded around the rod 22. (See FIG. 6.) Once the plate 20 and rod 22 are removed from the container 12, the plate 20 is grasped and the molded wax is removed from the plate 20 so that a hole 30 is formed through the center of the molded wax. (See FIG. 7.) Or, one could hold the molded wax on the sides and push the rod through the wax by pressing or slightly tapping the rod against a hard surface. Next, a waxed wick 32, as sew in FIG. 8, is inserted through the hole 30 in the molded wax thereby forming a candle. (See FIG. 9.)

The wick 32 should be waxed so that it may be easily threaded through the candle. Also, the wick 32 may be cut to any desired length. The end 34 of the wick extending from the bottom 36 of the candle may have a stand or disk made from aluminum or the like material attached thereto. The stand can be molded onto the bottom of the candle and aids in maintaining the wick 32 within the candle. Alternatively, the end 34 of the wick may be folded against the bottom 36 of the candle. The outer diameter of the rod should be equal to or slightly larger than the outer diameter of the wick being used. Thus, the wick will fit securely when placed within the molded wax. As the candle is burned and the wax melts, the wick will fit even more securely within the candle.

The present invention may be embodied in other specific forms without departing from the spirit or essential attributes thereof and accordingly, reference should be made to the appended claims rather than to the foregoing specification as indicating the scope of the invention.

We claim:

1. A method of molding a candle comprising the steps of:

providing a container having a top and a bottom, a bottom wall enclosing said bottom of said container, a side wall extending upwardly from said bottom wall, and a rim extending around said side wall and a plate with a rod attached to said plate;

inserting said plate within said container so that said rod extends above said rim of said container and said plate tests on said bottom wall;

pouring hot wax into said container and allowing said wax to cool;

grasping said rod once said wax is completely cooled; and lifting said rod to thereby remove said plate and rod entirely from said container with said wax molded around said rod.

2. The method of molding a candle of claim 1 further including the step of removing said molded wax from said plate and said rod so that a hole is formed through the center of said wax.

3. The method of molding a candle of claim 2 further including the step of inserting a waxed wick through the hole in said molded wax.

* * * * *

UNITED STATES PATENT AND TRADEMARK OFFICE

CERTIFICATE OF CORRECTION

PATENT NO. : 6,471,899 B2
DATED : October 29, 2002
INVENTOR(S) : Paul M. Daiber et al.

It is certified that error appears in the above-identified patent and that said Letters Patent is hereby corrected as shown below:

Column 3,
Line 34, "sew" should read -- seen --.

Column 4,
Line 25, "tests" should read -- rests --.

Signed and Sealed this

Twenty-fifth Day of February, 2003

JAMES E. ROGAN
*Director of the United States Patent and Trademark Office*